(12) United States Patent
Agarwal et al.

(10) Patent No.: US 11,974,226 B2
(45) Date of Patent: Apr. 30, 2024

(54) METHOD AND UE FOR MANAGING SLEEP DURATION IN CDRX SESSION

(71) Applicant: Samsung Electronics Co., Ltd., Suwon-si (KR)

(72) Inventors: Rishav Agarwal, Bangalore (IN); Jajohn Mathew Mattam, Bangalore (IN)

(73) Assignee: Samsung Electronics Co., Ltd., Suwon-si (KR)

(*) Notice: Subject to any disclaimer, the term of this patent is extended or adjusted under 35 U.S.C. 154(b) by 469 days.

(21) Appl. No.: 17/475,930

(22) Filed: Sep. 15, 2021

(65) Prior Publication Data

US 2022/0086760 A1    Mar. 17, 2022

Related U.S. Application Data

(63) Continuation of application No. PCT/KR2021/012583, filed on Sep. 15, 2021.

(30) Foreign Application Priority Data

Sep. 17, 2020  (IN) ............................. 202041040349
Sep. 6, 2021   (IN) ............................. 2020 41040349

(51) Int. Cl.
*H04W 52/02*    (2009.01)
*H04L 1/18*     (2023.01)
(Continued)

(52) U.S. Cl.
CPC ....... *H04W 52/0232* (2013.01); *H04L 1/1819* (2013.01); *H04L 1/203* (2013.01); *H04W 72/21* (2023.01); *H04W 80/02* (2013.01)

(58) Field of Classification Search
CPC . H04W 52/0232; H04W 72/21; H04W 80/02; H04L 1/1819; H04L 1/203
See application file for complete search history.

(56) References Cited

U.S. PATENT DOCUMENTS 9,591,572 B2      3/2017  Zhao et al.
10,034,196 B2 *   7/2018  Yang ................. H04W 28/0278
(Continued)

FOREIGN PATENT DOCUMENTS

KR    10-2020-0098698 A    8/2020
WO      2019/192342 A1    10/2019
(Continued)

OTHER PUBLICATIONS

Indian Examination Report dated May 5, 2022, issued in Indian Application No. 202041040349.
(Continued)

*Primary Examiner* — Bailor C Hsu
(74) *Attorney, Agent, or Firm* — Jefferson IP Law, LLP

(57) ABSTRACT

A method for managing sleep duration in a 5$^{th}$ Generation (5G) and a user equipment (UE) are provided. The method includes sending, by the UE, a plurality of data packets to a network in a connected mode discontinuous reception (cDRX) cycle and detecting, by the UE, an initiation of a retransmission timer associated with the plurality of data packets. The method includes determining, by the UE, if a retransmission of at least one data packet the plurality of data packets is required, and causing, by the UE, to sleep before an expiry of the retransmission timer, in response to determining that the retransmission of the at least one data packet of the plurality of data packets is not required.

17 Claims, 12 Drawing Sheets

(51) Int. Cl.
*H04L 1/1812* (2023.01)
*H04L 1/20* (2006.01)
*H04W 72/04* (2023.01)
*H04W 72/21* (2023.01)
*H04W 80/02* (2009.01)

(56) References Cited

U.S. PATENT DOCUMENTS

| | | | | |
|---|---|---|---|---|
| 10,129,827 | B2* | 11/2018 | Latheef | H04L 1/188 |
| 10,887,834 | B2 | 1/2021 | Ryoo et al. | |
| 11,032,831 | B2* | 6/2021 | Zhang | H04L 1/1854 |
| 11,297,674 | B2* | 4/2022 | He | H04W 76/28 |
| 11,356,954 | B2* | 6/2022 | Khoshnevisan | H04W 28/04 |
| 2014/0023047 | A1* | 1/2014 | Aue | H04W 4/18 370/336 |
| 2014/0295820 | A1* | 10/2014 | Kim | H04W 52/0225 455/418 |
| 2017/0026948 | A1* | 1/2017 | Yang | H04W 72/20 |
| 2018/0049272 | A1* | 2/2018 | Bagheri | H04W 76/28 |
| 2019/0159126 | A1 | 5/2019 | Kadiri et al. | |
| 2020/0145922 | A1 | 5/2020 | Agrawal et al. | |
| 2020/0195410 | A1 | 6/2020 | Li et al. | |
| 2020/0245333 | A1 | 7/2020 | Lin et al. | |
| 2020/0245395 | A1 | 7/2020 | Zhang et al. | |
| 2020/0260377 | A1 | 8/2020 | Jin et al. | |
| 2020/0275372 | A1 | 8/2020 | Lin et al. | |
| 2021/0014028 | A1 | 1/2021 | You et al. | |
| 2021/0022080 | A1* | 1/2021 | Chang | H04W 52/0229 |
| 2021/0218538 | A1 | 7/2021 | Myung et al. | |

FOREIGN PATENT DOCUMENTS

| | | |
|---|---|---|
| WO | 2020/029568 A1 | 2/2020 |
| WO | 2020/145876 A1 | 7/2020 |
| WO | 2020/168330 A1 | 8/2020 |

OTHER PUBLICATIONS

Ericsson et al., cDRX enhancement for CA, R2-1913196, 3GPP TSG-RAN2 Meeting #107bis, Chongqing, China, Oct. 4, 2019.
International Search Report dated Dec. 17, 2021, issued in International Application No. PCT/KR2021/012583.
CATT; Report on [105bis#27][NR/Power Saving]—PDCCH skipping; 3GPP TSG-RAN WG2 Meeting #106; R2-1908072, May 13, 2019, Reno, Nevada.
CATT; RAN2 Impacts of PDCCH based WUS; 3GPP TSG-RAN WG2 Meeting #106; R2-1905666, RAN2 Impacts of PDCCH Based WUS, May 13, 2019, Reno, Nevada.
Extended European Search Report dated Oct. 13, 2023, issued in European Patent Application No. 21869705.0.

* cited by examiner

| Harq ID | Re-TX count |
|---|---|
| 1 | 0 |
| 2 | 0 |
| 3 | 2 |
| ... | |
| N (depends on RRC config) | 0 |

| Slot NO. | Re-TX count |
|---|---|
| 1 | 0 |
| 2 | 1 |
| 3 | 0 |
| ... | |
| 10/20/N (depends on SCS) | 0 |

FIG.4

METHOD AND UE FOR MANAGING SLEEP DURATION IN CDRX SESSION

CROSS-REFERENCE TO RELATED APPLICATION(S)

This application is a continuation application, claiming priority under § 365(c), of an International application No. PCT/KR2021/012583, filed on Sep. 15, 2021, which is based on and claims the benefit of an Indian provisional patent application number 202041040349, filed on Sep. 17, 2020, in the Indian Intellectual Property Office, and of an Indian Complete patent application number 202041040349, filed on Sep. 6, 2021, in the Indian Intellectual Property Office, the disclosure of each of which is incorporated by reference herein in its entirety.

TECHNICAL FIELD

The disclosure relates to a $5^{th}$ generation (5G) network. More particularly, the disclosure relates to a method and a user equipment (UE) for managing a sleep duration of the UE connected to a 5G network in a connected mode discontinuous reception (CDRX) communication session.

BACKGROUND ART

Generally, a user equipment (UE) may be configured to establish a connection with a network, such as a long term evolution (LTE) network, a $5^{th}$ Generation (5G) network and the like. Based upon the capabilities of the hardware and the software of the UE, the connection made with the network may include various functionalities, such as a discontinuous reception (DRX), connected DRX (CDRX) and the like. The DRX and CDRX functionalities of the network enables the UE to conserve energy and reduce a requirement of the power from a battery of the UE.

The Network configures CDRX for new radio (NR) UE in such a manner that a retransmission timer exceeds the inactivity timer in every ON cycle. Therefore, the NR-UE stays up waiting for the network to transmit a data center interconnect (DCI) for Uplink (UL) retransmission which will not happen in good UL conditions. The higher values of Re-Transmission (Retx) timer doesn't affect the network but causes a power loss at the UE. The UE is unnecessarily awake for a longer duration of time in every ON cycle leading to a power loss in the UE. Referring to FIGS. 1A, 1B, 1C, and 1D, the network configures the CDRX for the UE such that a value of the retransmission timer exceeds an inactivity timer in every ON cycle according to the related art. The UE is in an active state waiting for the network to transmit a DCI for UL retransmission. The UE may not receive the DCI for re-transmission when an uplink channel condition is good. The longer value of retransmission timer causes a power loss at the UE side because the UE is unnecessarily awake for a longer time duration in every ON cycle. Based on a sub carrier spacing (SCS) the slot length will change i.e., the time duration for the re-transmission timer and in turn the awake time duration of the UE will change.

FIG. 1A illustrates an operation of a user equipment (UE) in a CDRX cycle according to the related art.

Referring to FIG. 1A, if the SCS is 15 kHz, 16 slots denotes 16 milliseconds and if the uplink transmission is performed 4 milliseconds after receiving the DCI grant, the re-transmission timer runs for 10 ms extra. In another example, if the SCS is 30 kHz, 16 slots denotes 8 milliseconds, and the retransmission timer runs for 2 milliseconds extra.

Further, a bandwidth part (BWP) switching has been introduced in 5G networks for a variety of reasons, such as power saving and service adaptation. There are four techniques for BWP switching including a radio resource control (RRC) based technique, a medium access control element (MAC CE) based technique, a DCI based technique, and a bandwidth parts (BWP) inactivity timer based technique.

Except in the RRC based signaling, the CDRX configuration will remain the same after the BWP switch in the other techniques for BWP switching. The network may choose to reconfigure the CDRX every time a UL BWP switch happens. But the network reconfiguring the CDRX defeats the purpose of L2 level signaling which is faster than BWP switching. In the NR-UE the BWP switching happens dynamically and frequently. Therefore there is a need to handle the power loss in the UE by the UE itself due to the stagnant nature of CDRX during switching, instead of relying on the network to reconfigure CDRX every time.

The above information is presented as background information only to assist with an understanding of the disclosure. No determination has been made, and no assertion is made, as to whether any of the above might be applicable as prior art with regard to the disclosure.

DISCLOSURE

Technical Problem

Aspects of the disclosure are to address at least the above-mentioned problems and/or disadvantages and to provide at least the advantages described below. Accordingly, an aspect of the disclosure is to provide a method and system of managing a sleep duration of a user equipment (UE) connected to a $5^{th}$ generation (5G) network in a connected mode discontinuous reception (CDRX) communication session.

Another aspect of the disclosure is to provide a power saving technique in new radio-user equipment (NR-UE) by improving connected mode discontinuous reception (CDRX) mechanism during uplink sessions and uplink bandwidth part switching.

Another aspect of the disclosure is to provide a technique for monitoring uplink channel parameters and re-transmission count for the data packets.

Additional aspects will be set forth in part in the description which follows and, in part, will be apparent from the description, or may be learned by practice of the presented embodiments.

Technical Solution

In accordance with an aspect of the disclosure, a method for managing sleep duration in a $5^{th}$ generation (5G) user equipment (UE) is provided. The method includes sending, by the UE, a plurality of data packets to a network in a connected mode discontinuous reception (cDRX) cycle and detecting, by the UE, an initiation of a retransmission timer associated with the plurality of data packets. Further, the method includes determining, by the UE, if a retransmission of at least one data packet the plurality of data packets is required, and causing, by the UE, to sleep before an expiry of the retransmission timer, in response to determining that the retransmission of the at least one data packet of the plurality of data packets is not required.

In an embodiment of the disclosure, the method includes detecting, by the UE, a next cDRX cycle, and causing, by the UE, to wake up for the transmission of the plurality of data packets, in response to detecting the next cDRX cycle.

In an embodiment of the disclosure, determining, by the UE, if a retransmission of at least one data packet the plurality of data packets is required includes detecting, by the UE, a transmission of the plurality of data packets is nearing completion, and determining, by the UE, if the retransmission of at least one data packet the plurality of data packets is required, in response to detecting that the transmission of the plurality of data packets is nearing completion.

In an embodiment of the disclosure, the at least one data packet of the plurality of data packets is determined as a last data packet sent by the UE during the retransmission timer based on buffer status of upper layers and on detecting that there are no data packets of the plurality of data packets pending for the transmission.

In an embodiment of the disclosure, determining, by the UE, if the retransmission of the plurality of data packets is required comprises determining at least one of a connection quality of the network to be above a threshold and hybrid automatic repeat request (HARQ) retransmission process history and associated block error rate (BLER) indicating one of a no failure or negligible failure in the transmission of the plurality of data packets.

In an embodiment of the disclosure, the uplink channel condition parameters comprises at least one of reference signal received power (RSRP), downlink (DL) path loss, reference signal received quality (RSRQ), UL block error rate (BLER), signal-to-interference-plus-noise ratio (SINR), UL transmission (TX) power, and a re-transmission (Re-Tx) count value for each of a hybrid automatic repeat request (HARQ) identification (HARQ-ID).

In an embodiment of the disclosure, determining the start of the sleep duration for the UE based on the uplink channel condition parameters including the Re-Tx count value comprises detecting a status of a Re-Tx timer associated with one or more one uplink transmissions upon the completion of the inactivity timer, wherein the status comprises one of a ON and OFF. Further, identifying at least one HARQ-ID and one or more slots associated with the at least one HARQ-ID when the status of the Re-Tx timer associated with the one or more uplink transmissions is ON. Furthermore, determining the start of the sleep duration for the UE as the completion of the inactivity timer when the Re-Tx count value for the one or more uplink transmissions is lesser than a first pre-defined threshold. Alternatively, determining the start of the sleep duration for the UE as the completion of the Re-Tx timer of an uplink transmission from the one or more uplink transmissions when the Re-Tx count value of the one or more uplink transmissions subsequent to the uplink transmission is lesser than the first pre-defined threshold.

In an embodiment of the disclosure, determining the start of the sleep duration for the UE based on the uplink channel condition parameters excluding the Re-Tx count value, comprises comparing the plurality of values associated with an uplink channel condition parameters with a second pre-defined threshold after a pre-determined time from the completion of the inactivity timer. Further, determining the start of the sleep duration for the UE as the pre-determined time when a result of comparison indicates that the plurality of values are greater than the second pre-defined threshold. Furthermore, determining the start of the sleep duration for the UE as the completion of the Re-Tx timer when the result of comparison indicates that the plurality of values are lesser than the second pre-defined threshold.

In an embodiment of the disclosure, determining the start of the sleep duration for the UE based on the uplink channel condition parameters comprises providing at least one of the plurality of values associated with the uplink channel condition parameters, a HARQ-ID, and one or more slot numbers as an input to a pre-trained model. Further, determining the start of the sleep duration for the UE based on an output of the pre-trained model.

In an embodiment of the disclosure, determining, by the UE, that there are no UL data pending at upper layers and a protocol data unit (PDU) to be transmitted is an end-marker MAC PDU, and notifying, by the UE, to the network the PDU to be transmitted is the end-marker MAC PDU by one of setting a reserved bits in MAC PDU header, UL MAC CE and UCI.

In an embodiment of the disclosure, the method further includes detecting, by the 5G network, the notification that the PDU to be transmitted is the end-marker MAC PDU and determining, by the 5G network, whether the end-marker MAC PDU is received at the 5G network successfully. Further, the method includes performing, by the 5G network, one of send a MAC CE DRX Command for early Sleep in DL, in response to determining that the end-marker MAC PDU RX is successful and send one of a new DL DCI and a new UL grant for RETX, in response to determining that the end-marker MAC PDU RX is not successful.

In accordance with another aspect of the disclosure, a user equipment (UE) for managing a sleep duration when connected to a $5^{th}$ generation (5G) network is provided. The UE includes a memory, a processor and a sleep duration controller. The sleep duration controller is configured to send a plurality of data packets to a network in a connected mode discontinuous reception (cDRX) cycle and detect an initiation of a retransmission timer associated with the plurality of data packets. The sleep duration controller is also configured to determine if a retransmission of at least one data packet of the plurality of data packets is required, and cause to sleep before an expiry of the retransmission timer, in response to determining that the retransmission of the at least one data packet of the plurality of data packets is not required.

In an embodiment of the disclosure, the uplink channel condition parameters comprises at least one of reference signal received power (RSRP), downlink (DL) path loss, reference signal received quality (RSRQ), UL block error rate (BLER), signal-to-interference-plus-noise ratio (SINR), UL transmission (TX) power, and a re-transmission (Re-Tx) count value for each of a hybrid automatic repeat request (HARQ) identification (HARQ-ID).

In an embodiment of the disclosure, the sleep duration controller is configured to determine the start of the sleep duration for the UE based on the uplink channel condition parameters including the Re-Tx count value comprises detecting a status of a Re-Tx timer associated with one or more one uplink transmissions upon the completion of the inactivity timer, wherein the status comprises one of a ON and OFF. Further, identifying at least one HARQ-ID and one or more slots associated with the at least one HARQ-ID when the status of the Re-Tx timer associated with the one or more uplink transmissions is ON. Furthermore, determining the start of the sleep duration for the UE as the completion of the inactivity timer when the Re-Tx count value for the one or more uplink transmissions is lesser than a first pre-defined threshold. Alternatively, determining the start of the sleep duration for the UE as the completion of the Re-Tx timer of an uplink transmission from the one or more uplink transmissions when the Re-Tx count value of the one or more uplink transmissions subsequent to the uplink transmission is lesser than the first pre-defined threshold.

In an embodiment of the disclosure, the sleep duration controller is configured to determine the start of the sleep duration for the UE based on the uplink channel condition parameters excluding the Re-Tx count value, comprises comparing the plurality of values associated with an uplink channel condition parameters with a second pre-defined threshold after a pre-determined time from the completion of the inactivity timer. Further, determining the start of the sleep duration for the UE as the pre-determined time when a result of comparison indicates that the plurality of values are greater than the second pre-defined threshold. Furthermore, determining the start of the sleep duration for the UE as the completion of the Re-Tx timer when the result of comparison indicates that the plurality of values are lesser than the second pre-defined threshold.

In an embodiment of the disclosure, the sleep duration controller is configured to determine the start of the sleep duration for the UE based on the uplink channel condition parameters comprises providing at least one of the plurality of values associated with the uplink channel condition parameters, HARQ-ID, slot numbers, and Re-Tx count value as an input to a pre-trained model. Further, determining the start of the sleep duration for the UE based on an output of the pre-trained model.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which:

FIG. 1B illustrates log snippets associated with CDRX events according to the related art;

FIG. 1C illustrates log snippets for a scenario when UL bandwidth part (BWP) switch happens from a higher SCS to lower according to the related art;

FIG. 4 is a table illustrating Re-Transmission counts obtained by a UE during a CDRX ON cycle according to an embodiment of the disclosure;

The same reference numerals are used to represent the same elements throughout the drawings.

MODE FOR INVENTION

Figure 1A:
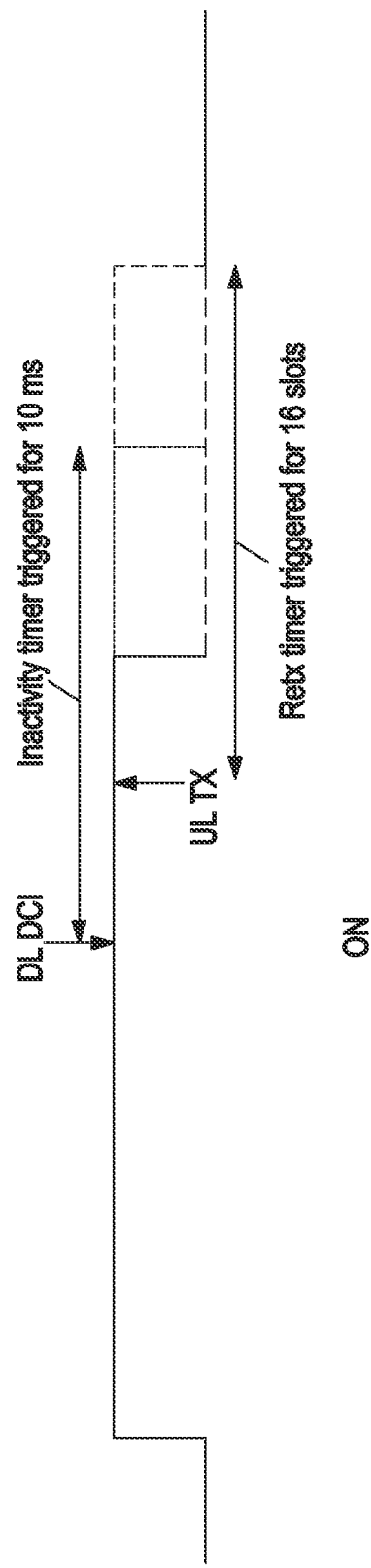
FIG. 1A illustrates an operation of a user equipment (UE) in a connected mode discontinuous reception (CDRX) cycle according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As is traditional in the field, embodiments may be described and illustrated in terms of blocks which carry out a described function or functions. These blocks, which may be referred to herein as units or modules or the like, are physically implemented by analog or digital circuits, such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports, such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the embodiment herein is to provide a method for managing sleep duration in a Fifth Generation (5G) User Equipment (UE). The method includes sending, by the UE, a plurality of data packets to a network in a connected mode discontinuous reception (cDRX) cycle and detecting, by the UE, an initiation of a retransmission timer associated with the plurality of data packets. Further, the method includes determining, by the UE, if a retransmission of at least one data packet the plurality of data packets is required; and causing, by the UE, to sleep before an expiry of the retransmission timer, in response to determining that the retransmission of the at least one data packet of the plurality of data packets is not required.

Accordingly, the embodiment herein provides a user equipment (UE) for managing sleep duration when connected to a $5^{th}$ Generation (5G) network. The UE includes a memory, a processor and a sleep duration controller. The sleep duration controller is configured to send a plurality of data packets to a network in a connected mode discontinuous reception (cDRX) cycle and detect an initiation of a retransmission timer associated with the plurality of data packets. The sleep duration controller is also configured to determine if a retransmission of at least one data packet of the plurality of data packets is required; and cause to sleep before an expiry of the retransmission timer, in response to determining that the retransmission of the at least one data packet of the plurality of data packets is not required.

Figure 1B:
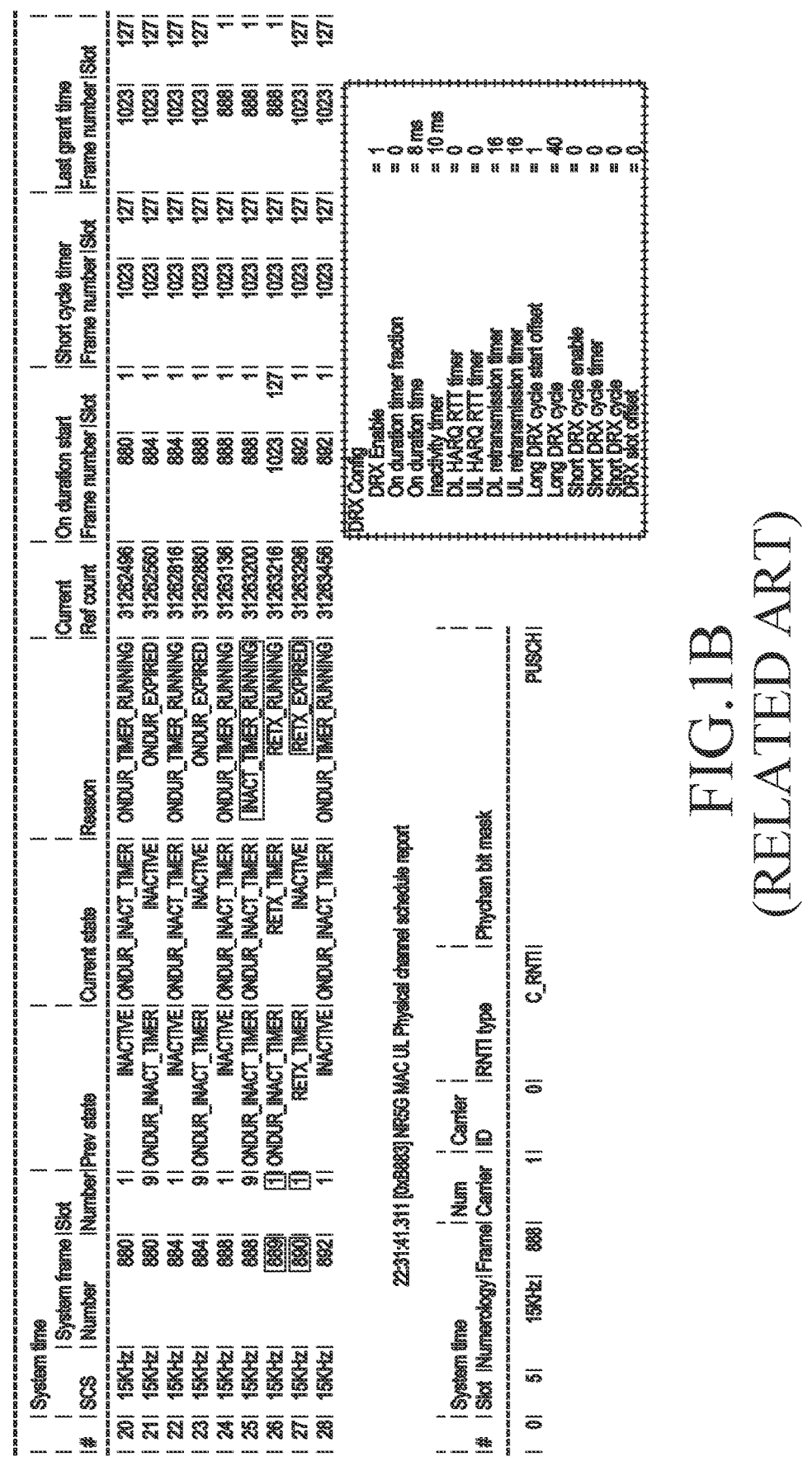

FIG. 1B illustrates log snippets associated with CDRX events according to the related art. From the log snippets the observations arrived at are as follows:

Referring to FIG. 1B, re-transmission timer configured for 16 slots and inactivity timer configured for 10 milli-seconds.

After last DL DCI received at [888,1] inactivity timer is on and expected to run until [889,1]

PUSCH TX happens at [888, 5] and it triggers the RETX timer then, since HARQ RTT timer in CDRX configuration is 0.

Inactivity timer expires at [889,1] but Retransmission timer continues to run waiting for any possible re-transmission which might happen UL channel conditions are too good to expect any Retransmissions UE goes to sleep after Retx timer expires at [890,1] and it runs for 10 ms extra even though no RETX happened.

This scenario repeats in every CDRX Cycle where UE is ON for a prolonged period after inactivity timer's expiry depending upon the point of trigger of Retransmission timer.

Figure 1C:
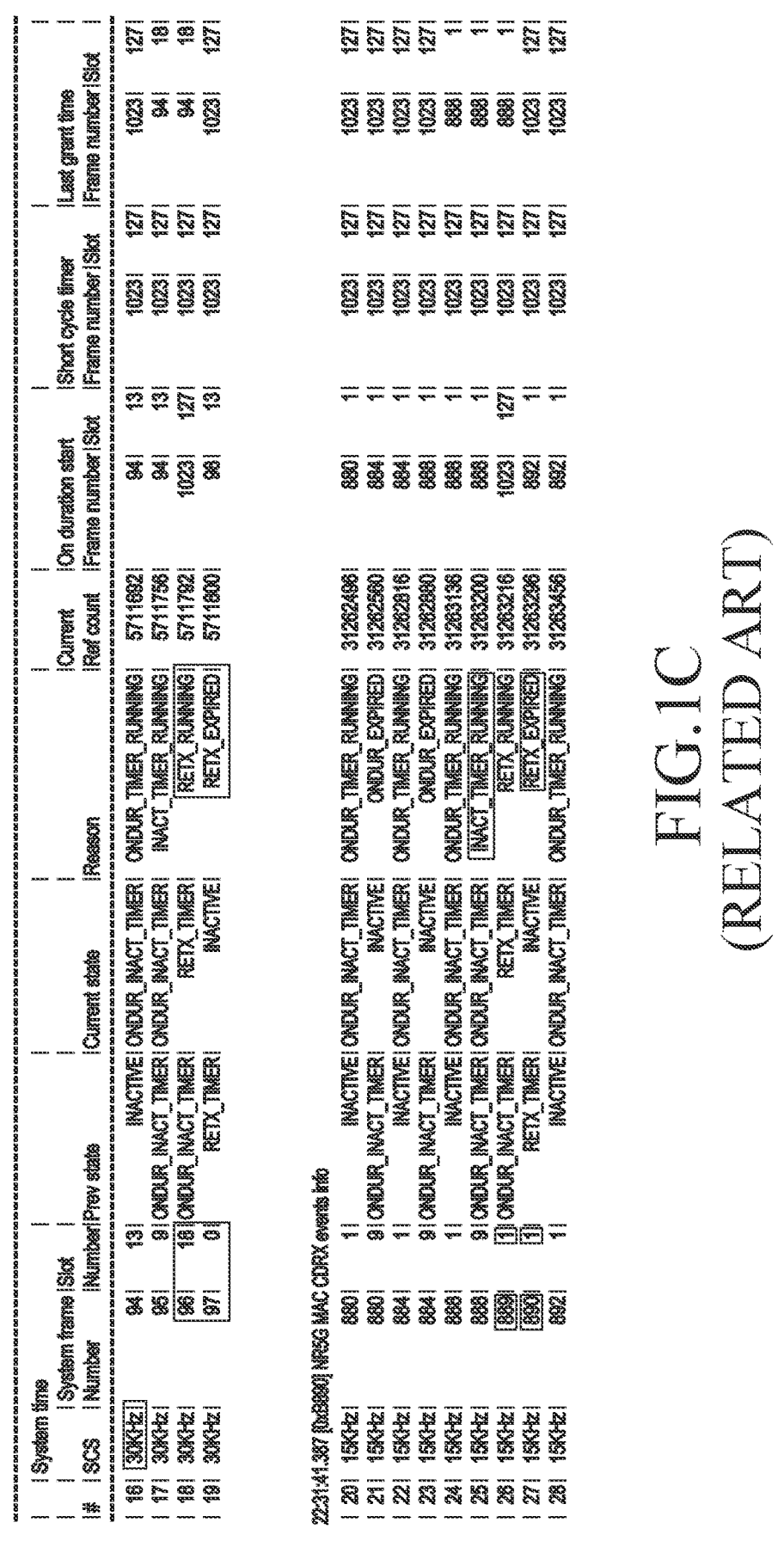

FIG. 1C illustrates log snippets for a scenario when UL BWP switch happens from a higher SCS to lower according to the related art.

Referring to FIG. 1C, two excerpts from the logs with SCS 30 and 15 Khz respectively are observed. The CDRX configuration is same for both the SCS. During the BWP switching the Retx timer is running 10 times more in the lower SCS Bandwidth. Above in the SCS 30 khz, the Retx timer runs extra for 2 slots: 1 ms, whereas after switch the Retx timer will run for 10 slots: 10 ms extra after inactivity timer expiry.

Whenever a UL BWP switch happens from a higher SCS to lower, this situation will present itself. The RETX timer will run a lot longer in lower SCS region than in the higher SCS BWP because the slot length is inversely proportional to the SCS. RRC based BWP switch will not see this issue because the CDRX can be reconfigured in the same signaling message. In L2 based BWP switching like MAC CE/DCI network might not send a new CDRX configuration every time a BWP switch happens because there are many possibilities of switching between two BWPs and if such a situation can be handled on the UE side the reliability on the network will decrease and power will be saved in good or better than average uplink channel conditions.

Figure 1D:
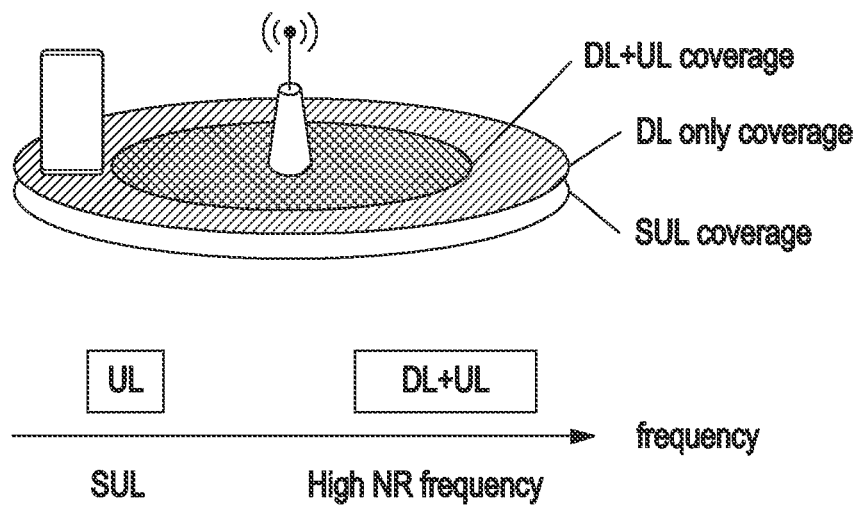
FIG. 1D illustrates a scenario of a constant CDRX when UL switches from NUL to supplementary uplink (SUL) according to the related art.

FIG. 1D illustrates a scenario of a constant CDRX when UL switches from NUL to supplementary uplink (SUL) according to the related art.

Referring to FIG. 1D, generally, the cell coverage in the UL direction is lower than the DL direction because transmission power of the UE (UL Power) is not as strong as transmission power of the gNB (DL Power). As a result, performance degradation is observed on the UL direction which becomes of serious concern as the UE approaches to cell edge. To address the performance degradation, the SULs at lower frequency than the ULs are introduced to increase the coverage. However when the SUL carriers use sub-6 frequencies (i.e., NR bands dedicated to SUL are n80, n81, n82, n83, n84, n8) the NUL carrier may be mm-wave with SCS 120 KHz. The CDRX will remain constant. However, the power needs to be saved when the UL switches from the NUL to the SUL of lower SCS thus causing the UE to remain ON for an unnecessary long time even when the signal conditions are good.

In methods and systems, of the related art, a time-alignment is performed based on status of different timers in CDRX which capture traffic dynamics and trigger BWP adaptation to eventually reduce UE power consumption. Also, the CDRX timer status triggers to switch active BWPs and/or monitoring schedules to improve HARQ monitoring performance in a 5G NR communication system.

In methods and systems, of the related art, provides power-saving during UL/DL data session in RRC Inactive state by using separate DRX configuration for inactive state and early entry into inactive state with network assistance.

Unlike to the methods and systems, of the related art, the proposed manages various scenarios where CDRX might remain stagnant, such as BWP switch, SUL, etc which may have otherwise caused the UE to remain ON unnecessarily waiting for RETX grants. The proposed method includes saving power by monitoring UL parameters and forcing the UE to sleep early if the Retx probability is negligible.

Referring now to the drawings and more particularly to FIGS. 2 to 10, where similar reference characters denote corresponding features consistently throughout the figures, there are shown preferred embodiments.

Figure 2:
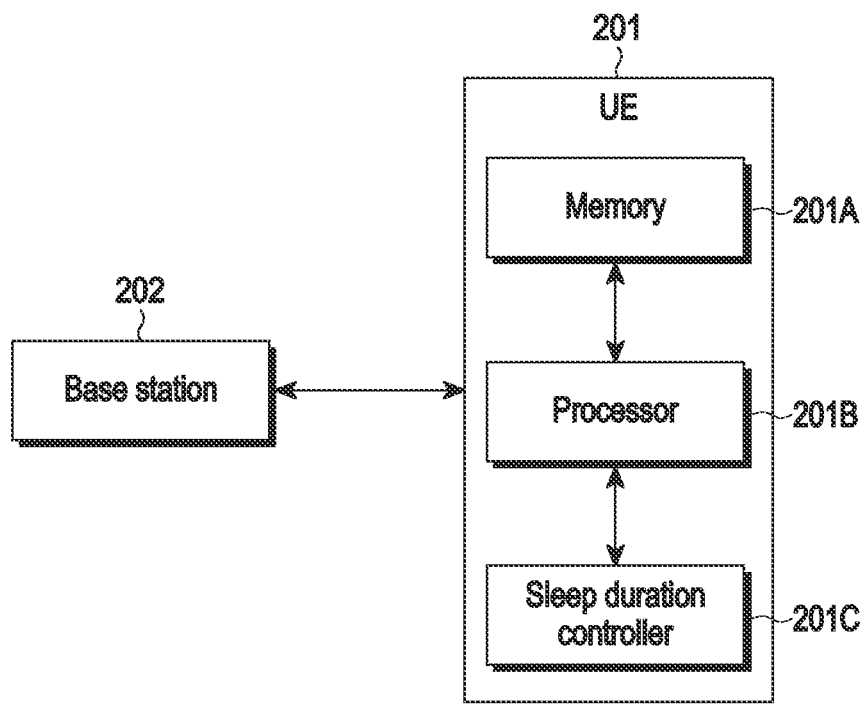
FIG. 2 illustrates a block diagram of a UE for managing sleep duration in a CDRX communication session according to an embodiment of the disclosure.

FIG. 2 illustrates a block diagram of a user equipment (UE) for managing a sleep duration in a CDRX communication session according to an embodiment of the disclosure.

Referring to FIG. 2, a UE (201) is for example but not limited to a mobile phone, a laptop, a smart phone, a personal digital assistant (PDA), a tablet, a wearable device, or the like. The UE (201) includes a memory (201A), a processor (201B) and a sleep duration controller (201C) communicatively coupled to the memory (201A) and the processor (201B).

The memory (201A) can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (201A) may, in some examples, be considered a non-transitory storage medium. The term "non-transitory" may indicate that the storage medium is not embodied in a carrier wave or a propagated signal. However, the term "non-transitory" should not be interpreted that the memory (201A) is non-movable. In some examples, the memory (201A) is configured to store larger amounts of information. In certain examples, a non-transitory storage medium may store data that can, over time, change (e.g., in a random access memory (RAM) or cache).

The processor (201B) is coupled with the memory (201A) and the sleep duration controller (201C). The processor (201B) may include one or a plurality of processors. The one or the plurality of processors may be a general-purpose processor, such as a central processing unit (CPU), an application processor (AP), or the like, a graphics-only processing unit, such as a graphics processing unit (GPU), a visual processing unit (VPU), and/or an AI-dedicated processor, such as a neural processing unit (NPU). The processor (201B) may include multiple cores and is configured to execute the instructions stored in the memory (201A).

The sleep duration controller (201C) is implemented by processing circuitry, such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards, and the like.

In an embodiment of the disclosure, the sleep duration controller (201C) is configured to communicate with a base station (202) via a communication channel for sending and receiving data packets. The UE (201) may be for example but not limited to a new radio UE, a mobile device, a smart watch, a tablet and the like. The base station (202) may be for example but not limited to at least one of a base transceiver station), NodeB, evolved NodeB, gNodeB, and the like. The communication channel may be a wireless channel operating in a frequency range of megahertz, gigahertz and the like. The UE (201) and the base station (202) may communicate using one or more wireless communication technologies, such as global system for mobile communications (GSM), universal mobile telecommunications system (UMTS), LTE, LTE-Advanced, 5G, and the like.

In an embodiment of the disclosure, the UE sleep duration controller (201C) establishes a connection with the base station (202) for sending and receiving the data packets. The UE (201) sending the data packets to the base station (202) is denoted as uplink transmission. The UE (201) receiving the data packets from the base station (202) is denoted as downlink transmission. Upon establishing the connection with the UE (201), the base station (202) may configure the UE (201) to operate using a Connected Mode Discontinuous Reception (CDRX) for the communication session.

The CDRX functionality relates to the synchronization of the UE (201) with the base station (202). During the communication session using the CDRX, the UE (201) is in one of an ON state or active mode, and OFF state or sleep mode. When the UE (201) is in the active state, the UE performs at least one of the uplink and the downlink transmission. When the UE (201) is in the sleep mode, the UE (201) does not perform the uplink and downlink transmission. The UE (201) during the active state monitors an inactivity timer, and one or more Re-Transmission (Re-Tx) timers. After, the expiry of the inactivity timer, and the one or more Re-Tx timers, the UE (201) switches from the active mode to the sleep mode.

In an embodiment of the disclosure, the sleep duration controller (201C) is configured to obtain a plurality of values associated with an uplink channel condition parameters after an initiation of a CDRX ON timer. The uplink channel condition parameters comprises at least one of Uplink (UL) Reference Signal Received Power (RSRP), Downlink (DL) Path Loss, UL Reference Signal Received Quality (RSRQ), UL Block Error Rate (BLER), UL signal-to-interference-plus-noise ratio (SINR), UL Transmission (TX) power, and a re-transmission (Re-Tx) count value for each of a Hybrid Automatic Repeat Request (HARQ) Identification (HARQ-ID).

Upon the completion of the inactivity timer, the sleep duration controller (201C) determines a start of the sleep duration for the UE based on the plurality of values associated with the uplink channel condition parameters. For example, if the UE sleep duration controller (201C) determines the uplink channel condition parameters are good, then the sleep duration controller (201C) determines the start of the sleep duration before the completion of the one or more Re-Tx timers.

In an embodiment of the disclosure, during uplink sessions and uplink bandwidth part switching, the sleep duration controller (201C) determines the uplink channel conditions to determine if the sleep duration controller (201C) can sleep early instead of waiting for the one or more Re-Tx timers to expiry. The sleep duration controller (201C) saves the power by sleeping early when the uplink channel conditions are good during mild uplink activities.

In another embodiment of the disclosure, consider that the MAC of the UE (201) detects that there are no UL data pending at upper layers for transmission and the PDU to be transmitted is the last one. Then the sleep duration controller (201C) is configured to notify the network that the PDU being transmitted is an end-marker MAC PDU. The sleep duration controller (201C) notifies the network by performing one of setting at least one reserved bit in a MAC PDU header, use UL MAC CE and UCI. The sleep duration controller (201C) is configured to determine whether the end-marker MAC PDU is received at the 5G network successfully. The network on detecting the PDU is the end-marker PDU sends a MAC CE DRX Command for Early Sleep in the DL if the PDU RX is successful and there is no more DCI/DL data scheduled in MAC scheduler. If the the end-marker MAC PDU RX is not successful, then the network sends either new DL DCI (if scheduled) or a new UL grant for RETX. The UE (201) will not sleep if the MAC CE for Early sleep (DRX CMD) is not received in response for end-marker PDU.

Although the FIG. 2 shows the hardware elements of the UE (201) but it is to be understood that other embodiments are not limited thereon. In other embodiments of the disclosure, the UE (201) may include less or more number of elements. Further, the labels or names of the elements are used only for illustrative purpose and does not limit the scope of the disclosure. One or more components can be combined together to perform same or substantially similar function.

Figure 3:
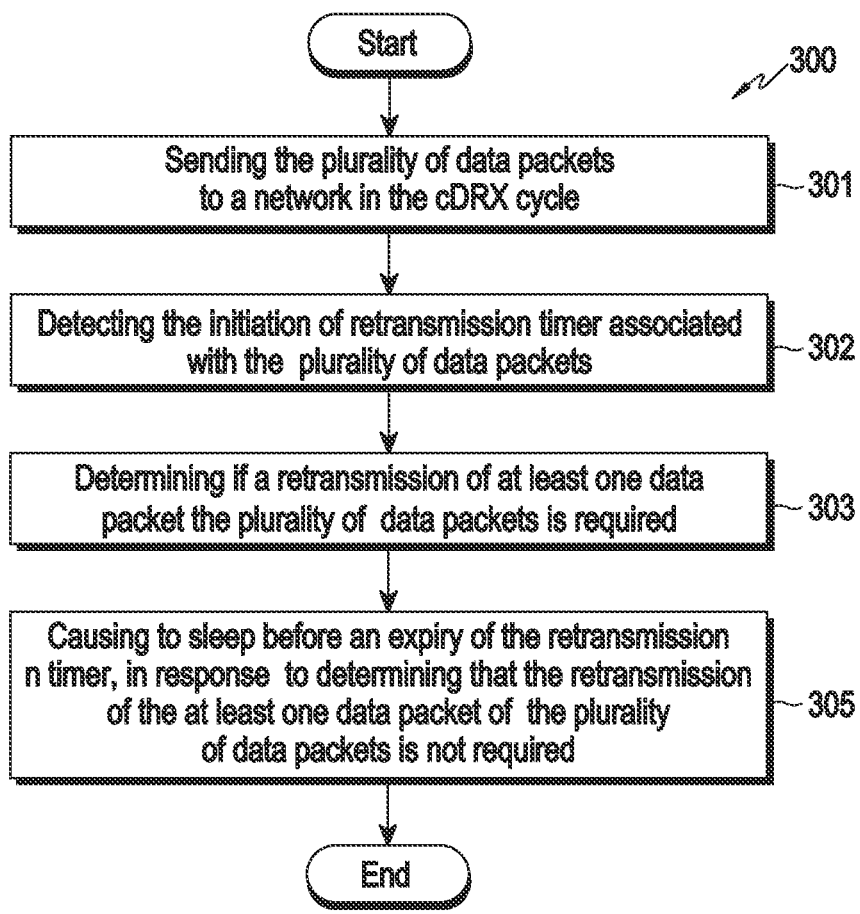
FIG. 3 illustrating a flowchart for managing a sleep duration of a UE connected to a 5G network in a CDRX communication session according to an embodiment of the disclosure.

FIG. 3 illustrates a flowchart 300 for managing sleep duration of a UE connected to a 5G network in the CDRX communication session according to an embodiment of the disclosure.

Referring to FIG. 3, at operation 301, the method includes sending the plurality of data packets to a network in the cDRX cycle. For example, in the UE (201) described in the FIG. 2, the sleep duration controller (201C) is configured to send the plurality of data packets to a network in the cDRX cycle.

At operation 302, the method includes detecting the initiation of retransmission timer associated with the plurality of data packets. For example, in the UE (201) described in the FIG. 2, the sleep duration controller (201C) is configured to detect the initiation of retransmission timer associated with the plurality of data packets.

At operation 303, the method includes determining if the retransmission of at least one data packet the plurality of data packets is required. For example, in the UE (201) described in the FIG. 2, the sleep duration controller (201C) is configured to determine if the retransmission of at least one data packet the plurality of data packets is required.

At operation 305, the method includes causing to sleep before an expiry of the retransmission timer, in response to determining that the retransmission of the at least one data packet of the plurality of data packets is not required. For example, in the UE (201) described in the FIG. 2, the sleep duration controller (201C) is configured to cause to sleep before an expiry of the retransmission timer, in response to determining that the retransmission of the at least one data packet of the plurality of data packets is not required.

The various actions, acts, blocks, operations, or the like in the method may be performed in the order presented, in a different order or simultaneously. Further, in some embodiments of the disclosure, some of the actions, acts, blocks, operations, or the like may be omitted, added, modified, skipped, or the like without departing from the scope of the disclosure.

FIG. 4 is a table illustrating Re-Transmission counts obtained by a UE during a CDRX ON cycle according to an embodiment of the disclosure.

Referring to FIG. 4, in an embodiment of the disclosure, the uplink channel condition parameters comprises at least one of uplink (UL) reference signal received power (RSRP), downlink (DL) Path Loss, UL reference signal received quality (RSRQ), UL block error rate (BLER), UL signal-to-interference-plus-noise ratio (SINR), UL Transmission (TX) power, and a re-transmission (Re-Tx) count value for each of a hybrid automatic repeat request (HARQ) Identification (HARQ-ID).

In an embodiment of the disclosure, the UE (201) stores an array of HARQ IDs associated with each uplink transmission in the memory (201A). Further, the UE (201) stores a count of re-transmissions performed for each of the HARQ IDs in the array of HARQ IDs. The UE (101) stores the count of the re-transmissions from a start of the CDRX ON cycle (i.e., active mode) till expiry of the inactivity timer referring to FIG. 4.

In an embodiment of the disclosure, the UE (201) stores an array of re-transmissions count for each slot to determine the slot wise uplink block error rate (BLER) as shown in FIG. 4.

Figure 5:
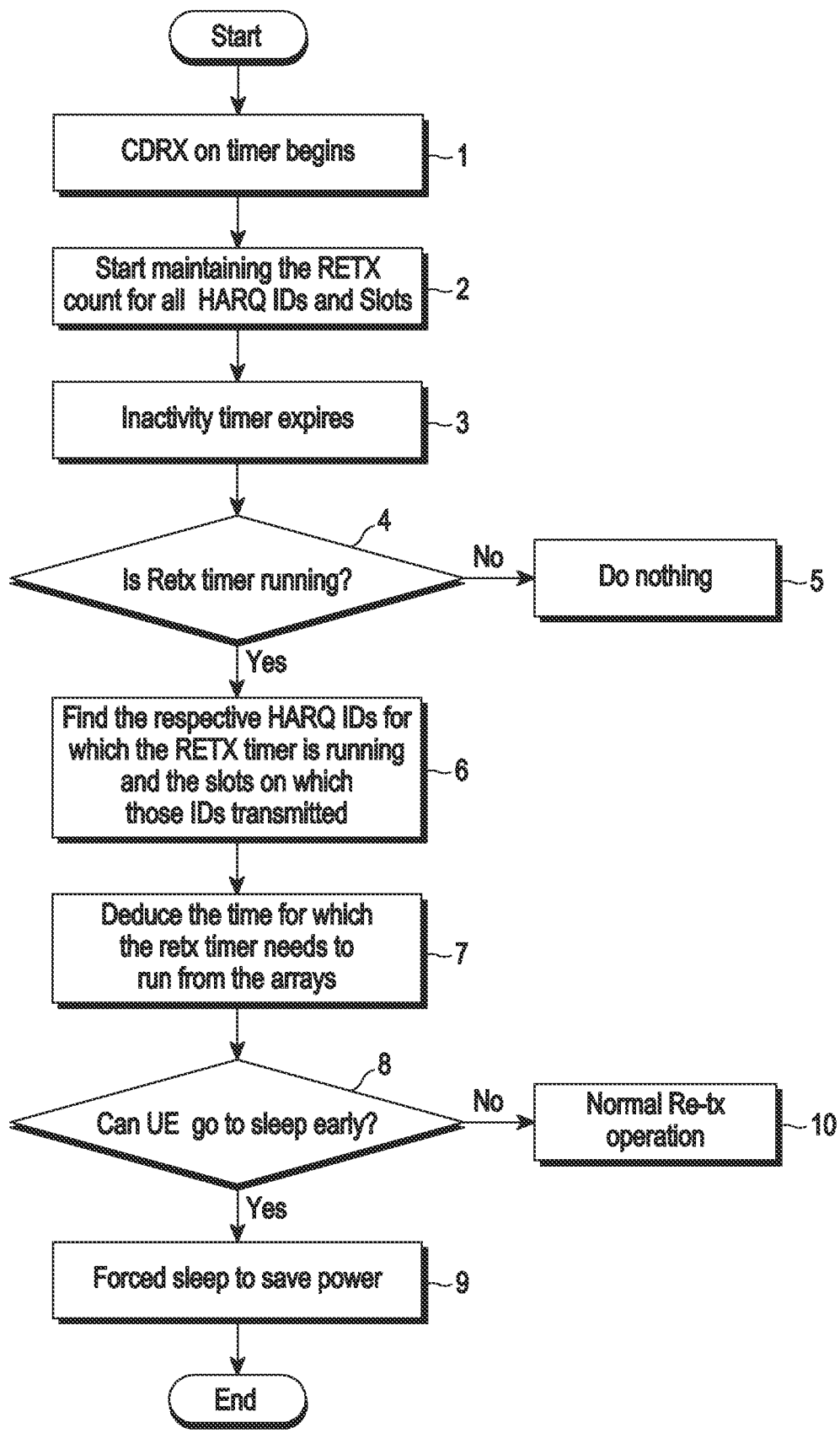
FIG. 5 illustrates a flow diagram for determining a sleep duration for a UE based on a Re-Transmission count associated with hybrid automatic repeat request (HARQ) identification (HARQ-ID) and a slot number according to an embodiment of the disclosure.

FIG. 5 illustrates a flow diagram for determining a sleep duration for a UE based on the Re-Transmission count associated with hybrid automatic repeat request (HARQ) identification (HARQ-ID) and a slot number according to an embodiment of the disclosure.

Referring to FIG. 5, the advantages of the proposed method include there is no need to monitor channel conditions as the increase or decrease in the count of Retransmissions depend on the UL/DL radio conditions. The method enables micro-managing the HARQ IDs every ON cycle to ensure that the device is not staying up longer than the device needs to waiting for the network to send the UL grant for retransmission which might not even happen if the packet was successfully transmitted and received by the network.

In 5G the only way UE comes to know about a need for RETX is when a DL DCI is received with a UL Grant and HARQ network device interface (NDI) un-toggled. So for every last transmission by all HARQ IDs in every ON cycle, the UE will continue to wait until RETX timer expires even in good UL conditions. The proposed method of operations 1-10 allows handling the time the UE remains ON for every ON cycle, so that the approach is flexible to work in all kind of signal conditions. The proposed method approach handles both scenarios un-optimal CDRX configuration by network and the UL BWP Switch.

Figure 6:
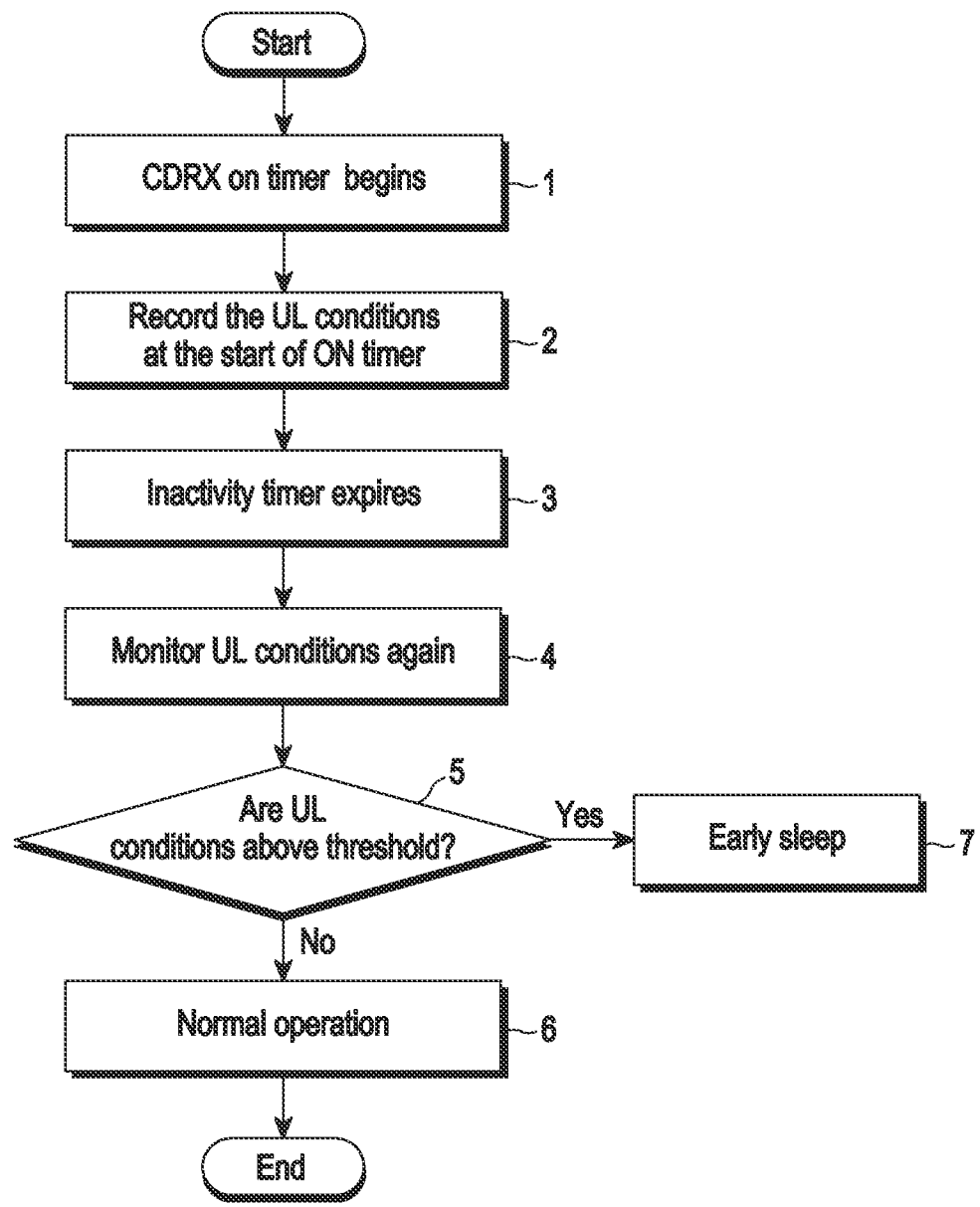
FIG. 6 illustrates a flow diagram for determining a sleep duration for a UE based on uplink channel condition excluding a Re-Transmission count value according to an embodiment of the disclosure.

FIG. 6 illustrates a flow diagram for determining a sleep duration for a UE based on uplink channel condition excluding a Re-Transmission count value according to an embodiment of the disclosure.

Referring to FIG. 6, the UE (201) obtains the plurality of values associated with the uplink channel condition parameters after the initiation of the ON cycle (i.e., an active state) of the CDRX communication session as shown in blocks 1 and 2 in FIGS. 5 and 6.

In an embodiment of the disclosure, the UE (201) determines the start of the sleep duration for the UE (201) based on the uplink channel condition parameters including the Re-Tx count value comprises detecting a status of the Re-Tx timer associated with one or more one uplink transmissions upon the completion of the inactivity timer as denoted by the blocks 3 and 4 in FIG. 5. The status of the Re-Tx timer comprises one of an ON and OFF. The status ON for the Re-TX timer denotes the UE (201) is waiting for the DCI from the base station (202) for re-transmitting the uplink data packets to the base station (202). The status OFF for the Re-TX timer denotes the UE (201) is not waiting for the DCI from the base station (202). When the status of the Re-Tx timer associated with each of the one or more one uplink transmissions is OFF, the UE (201) does nothing as denoted by the block 5 in FIG. 5.

In an embodiment of the disclosure, when the status of the Re-Tx timer associated with the one or more uplink transmissions is ON, the UE (201) identifies at least one HARQ-ID and one or more slots associated with the at least one HARQ-ID corresponding to the Re-Tx timer with the status as ON as denoted by the block 6 in FIG. 5. Further, the UE (201) computes the time duration for which the UE (201) should be in active mode based on the value of the one or more Re-Tx timer with the status as ON, as denoted by the block 7 in FIG. 5. For example, if two Re-Tx timers are having the status as ON, the UE (201) determines the time duration of the completion of the Re-Tx timers from the time instant the corresponding UL transmissions initiated by the UE (201) and the value of the Re-TX timers.

In an embodiment of the disclosure, the UE (201) determines the start of the sleep duration for the UE (201) as the completion of the inactivity timer when the Re-Tx count value for the one or more uplink transmissions is lesser than a first pre-defined threshold as denoted by blocks 8, and 9 in FIG. 5. The first pre-defined threshold may be 0, 1, 2, and the like stored in the memory (201A) of the UE (201).

The method provided in FIGS. 5 and 6 are highly efficient to deal with excess power consumption due to RETX timer's extension in good UL conditions. The method provided in the FIG. 5 is efficient during feeble uplink activities where the UL signal conditions will not change during the ON time duration. For the method provided in FIG. 5, it has to be assumed that the signal conditions, etc., will remain constant throughout the ON duration.

The method provided in FIG. 6 is more applicable for mild UL activities where the ON duration can get extended until 100 s of milli-seconds which might be sufficient for the UL conditions to change. In the method provided in the FIG. 6 the signal conditions are monitored at the start of the ON duration and at the end of Inactivity timer so that every time, the correct action can be taken. Since, this step will be done every ON cycle it is a flexible solution to deal with the power loss. Then method provided in the FIG. 6 can be adopted to handle all scenarios—un-optimal CDRX configuration by network, UL BWP Switch and SUL.

Figure 7:
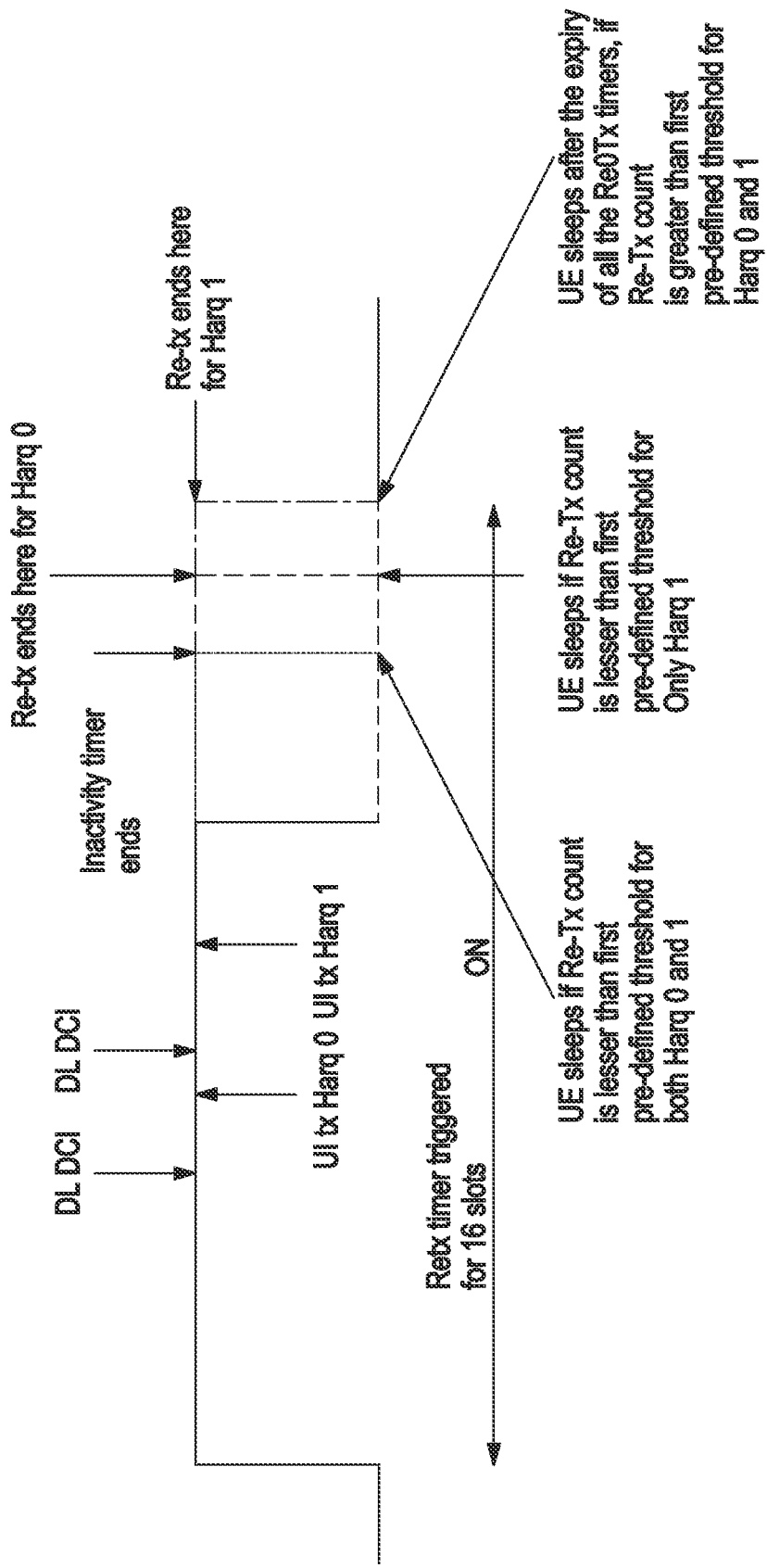
FIG. 7 illustrates a scenario for determining a sleep duration for a UE based on Re-Transmission count value according to an embodiment of the disclosure.

FIG. 7 illustrates a scenario for determining a sleep duration for a UE based on the Re-Transmission count value according to an embodiment of the disclosure.

Referring to FIG. 7, consider the CDRX cycle where the UE (201) receives two DL DCIs and the UE (201) performs two uplink transmissions with the HARQ-ID 1 and HARQ-ID 2 respectively. Upon the completion of the inactivity timer, the UE (201) compares the Re-Tx count of the HARQ-ID 1 and HARQ-ID 2 with the first pre-defined threshold. If the Re-Tx count of the HARQ-ID 1 and HARQ-ID 2 is lesser than the first pre-defined threshold, then the UE (201) determines the start of the sleep duration for the UE (201) as the completion of the inactivity timer because the uplink channel conditions are good and the UE (201) may not receive the DCIs for the re-transmission.

TABLE 1

| Harq ID | Re-TX count |
|---|---|
| 1 | 0 |
| 2 | 0 |
| 3 | 0 |
| ... | |
| N (depends on RRCconfig) | 0 |

TABLE 2

| Slot No. | Re-TX count |
|---|---|
| 1 | 0 |
| 2 | 0 |
| 3 | 0 |
| ... | |
| 10/20/N (depends on SCS) | 0 |

In an embodiment of the disclosure, the UE (201) determines the start of the sleep duration for the UE as the completion of the Re-Tx timer of an uplink transmission from the one or more uplink transmissions when the Re-Tx count value of the one or more uplink transmissions subsequent to the uplink transmission is lesser than the first pre-defined threshold as denoted by blocks 8, and 9 in FIG. 5.

For example, consider the CDRX cycle of FIG. 7, the UE (201) receives two DL DCIs and the UE (201) performs two uplink transmissions with the HARQ-ID 1 and HARQ-ID 2 respectively. Upon the completion of the inactivity timer, the UE (201) compares the Re-Tx count of the HARQ-ID 1 and HARQ-ID 2 with the first pre-defined threshold. If the Re-Tx count of the HARQ-ID 1 is lesser than the first pre-defined threshold and the Re-Tx count of the HARQ-ID 2 is greater than the first pre-defined threshold, then the UE (201) determines the start of the sleep duration for the UE (201) as the completion of the Re-Tx timer associated with the uplink transmission performed on HARQ-ID 1 because the uplink channel conditions are good for the HARQ-ID 2 and the UE (201) may not receive the DCIs for the re-transmission. Alternatively, if the Re-Tx count of the HARQ-ID 1 and HARQ-ID 2 is greater than the first pre-defined threshold, then the UE (201) determines the start of the sleep duration for the UE (201) as the completion of the Re-Tx timer associated the uplink transmission performed on HARQ-ID 1 and HRQ-ID 2 (i.e., a normal operation) as denoted by block 10 in FIG. 5.

If the Re-Tx count for the HARQ IDs/slots is negligible or below the first pre-defined threshold (i.e., decided via trial and error method), then the UE may go to forced sleep without having to wait for a UL grant for RETX which the base station will not send. Further, the Re-transmission timer duration may be modified depending on the last slots & HARQ IDs which transmitted. The UE (201) may modify Re-transmission timer duration in every ON cycle, and is a flexible approach to handle power saving in the UE (201).

In an embodiment of the disclosure, the UE (201) determines the start of the sleep duration for the UE (201) based on the uplink channel condition parameters excluding the Re-Tx count value, comprises comparing the plurality of values associated with the uplink channel condition parameters with a second pre-defined threshold after a pre-determined time from the completion of the inactivity timer as denoted by the blocks 4 and 5 in FIG. 6. The second pre-defined threshold may be stored in the memory (201A) of the UE (201). The pre-determined time may be 0 seconds, 10 microseconds, 1 millisecond and the like form the completion of the inactivity timer.

In an embodiment of the disclosure, the UE (201) determines the start of the sleep duration for the UE as the pre-determined time when a result of comparison indicates that the plurality of values are greater than the second pre-defined threshold as denoted by the blocks 5 and 7 in FIG. 6.

Figure 8:
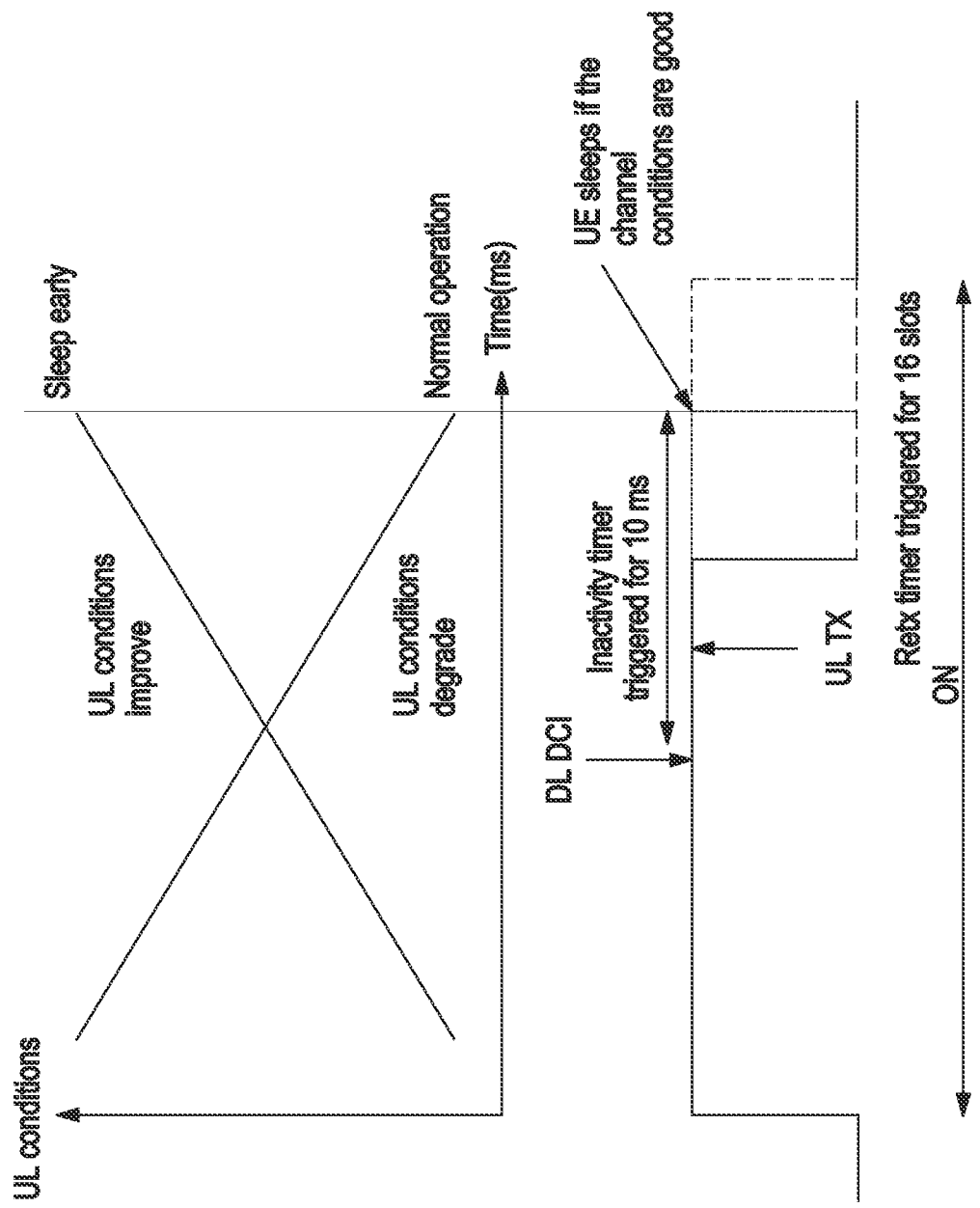
FIG. 8 illustrates a scenario for determining a sleep duration for a UE based on uplink channel condition according to an embodiment of the disclosure.

FIG. 8 illustrates a scenario for determining a sleep duration for a UE based on uplink channel condition according to an embodiment of the disclosure.

Referring to FIG. 8, consider the CDRX cycle where the UE (201) receives the downlink DCI and performs the uplink transmission. Generally, the successful receipt of the UL packets by the network heavily depends on the Uplink channel conditions and parameters, such as for example but not limited to UL RSRP, DL Path Loss, UL RSRQ, UL BLER, UL SINR and UL TX power. The uplink channel conditions can change and keep fluctuating during data activity and based on it the HARQ retransmissions will be affected.

The UE (201) compares the plurality of values associated with the uplink channel condition parameters with the second pre-defined threshold. If the result of comparison indicates the plurality of values are greater than the second pre-defined threshold, then the UE (201) determines start of the sleep duration as the completion of the inactivity timer and/or the pre-determined time and the UE (201) goes to the sleep mode referring to FIG. 8.

In an embodiment of the disclosure, the UE (201) determines the start of the sleep duration for the UE as the completion of the Re-Tx timer when the result of comparison indicates that the plurality of values are lesser than the second pre-defined threshold.

For example, consider the CDRX cycle as shown in FIG. 8, the UE (201) receives the downlink DCI and performs the uplink transmission. The UE (201) compares the plurality of values associated with the uplink channel condition parameters with the second pre-defined threshold. If the result of comparison indicates the plurality of values are lesser than the second pre-defined threshold, then the UE (201) determines start of the sleep duration as the completion of the Re-Tx timer and the UE (201) waits for the completion of the Re-Tx timer to go to the sleep mode referring to FIG. 8.

Therefore, based on the volume of activity, the on cycle can get stretched to an order of 100 s of ms which is a sufficient time interval for UL conditions to change from bad to good or good to bad. The proposed method includes monitoring the UL channel from start of the ON timer until inactivity timer expiry, and if the UL conditions are above threshold force early sleep on the UE to save power. If the UL conditions are good from the start and does not change (remain above set threshold) force early sleep the UE to save power. If the conditions become worse i.e., fall below set threshold, normal operation will continue.

Figure 9:
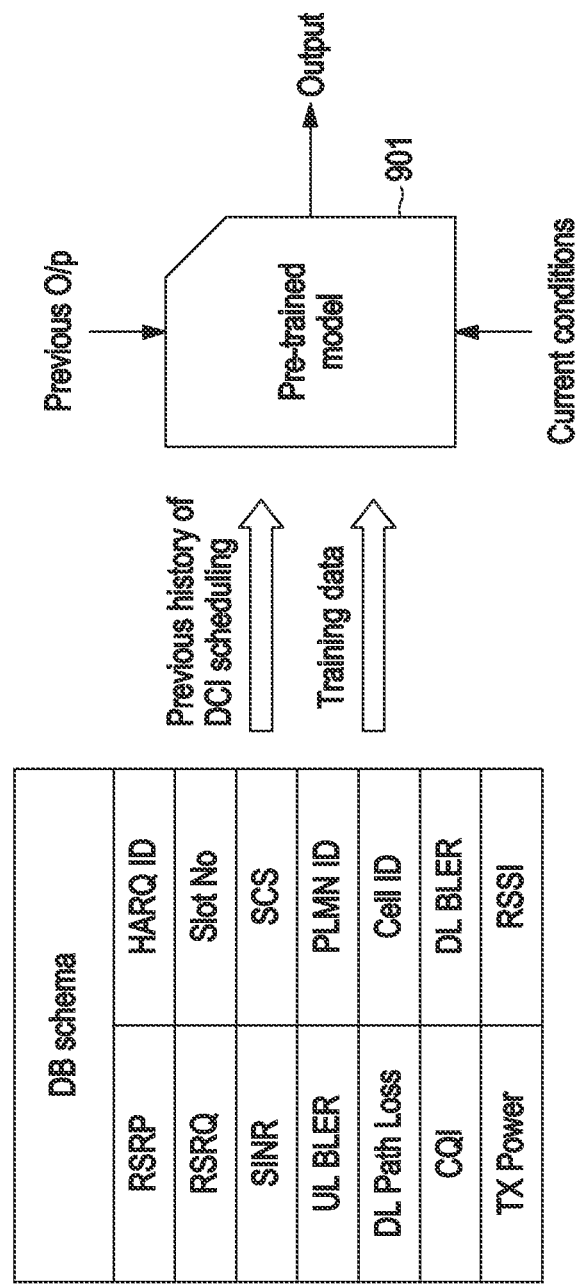
FIG. 9 illustrates a scenario for determining a sleep duration for a UE using a pre-trained model according to an embodiment of the disclosure.

FIG. 9 illustrates a scenario for determining a sleep duration for a UE using a pre-trained model according to an embodiment of the disclosure.

Referring to FIG. 9, the UE (201) determines the start of the sleep duration for the UE based on the uplink channel condition parameters by providing at least one of the plurality of values associated with the uplink channel condition parameters, a HARQ-ID, and one or more slot numbers as an input to a pre-trained model (901). The pre-trained model (901) may be an Artificial Intelligence model based on one of a supervised, unsupervised and a reinforcement learning technique. In addition to the plurality of values, previous outputs of the pre-trained model (901), DCI scheduling, and the like may be provided as the input to the pre-trained model (901) referring to FIG. 9. The UE (201) determines the start of the sleep duration for the UE based on an output of the pre-trained model (901). The output of the pre-trained model (901), denotes a prediction on the uplink channel conditions for a subsequent time duration. If the prediction on the uplink channel conditions denotes a good condition, then the UE (201) may go to the sleep state. If the prediction on the uplink channel conditions denotes a bad condition, then the UE (201) may be awake till the completion of the Re-Tx timers.

In an embodiment of the disclosure, the training data set comprises parameters, such as UL RSRP, RSRQ, SINR, HARQ ID, SLOT no., TX power, and the like. The model can be trained to predict if a re-transmission is possible during the time the Re-Tx timer is running. Further, the pre-trained model (901) is used to determine the possibility of re-transmission for all HARQ IDs with a high accuracy. Furthermore, necessary action may be taken to make the UE go to sleep early or let the normal operation continue. The module can be trained in UE (201) itself causing no extra latency.

During the uplink bandwidth parts (UL BWP) switching in new radio via data center interconnect (DCI) or medium access control element (MAC-CE) the CDRX configuration remains same and when a BWP switch happens from a higher to lower SCS, it is possible for the re-transmission timer to exceed the inactivity timer by a significant amount of time causing the UE (201) to stay awake unnecessarily in good UL conditions.

Further, the method also includes detecting by the 5G network the notification that the PDU to be transmitted is the end-marker MAC PDU and determining, by the 5G network, whether the end-marker MAC PDU is received at the 5G network successfully. Further, the method includes performing, by the 5G network, one of: send a MAC CE DRX Command for early Sleep in DL, in response to determining that the end-marker MAC PDU RX is successful and send one of a new DL DCI and a new UL grant for RETX, in response to determining that the end-marker MAC PDU RX is not successful.

Figure 10:
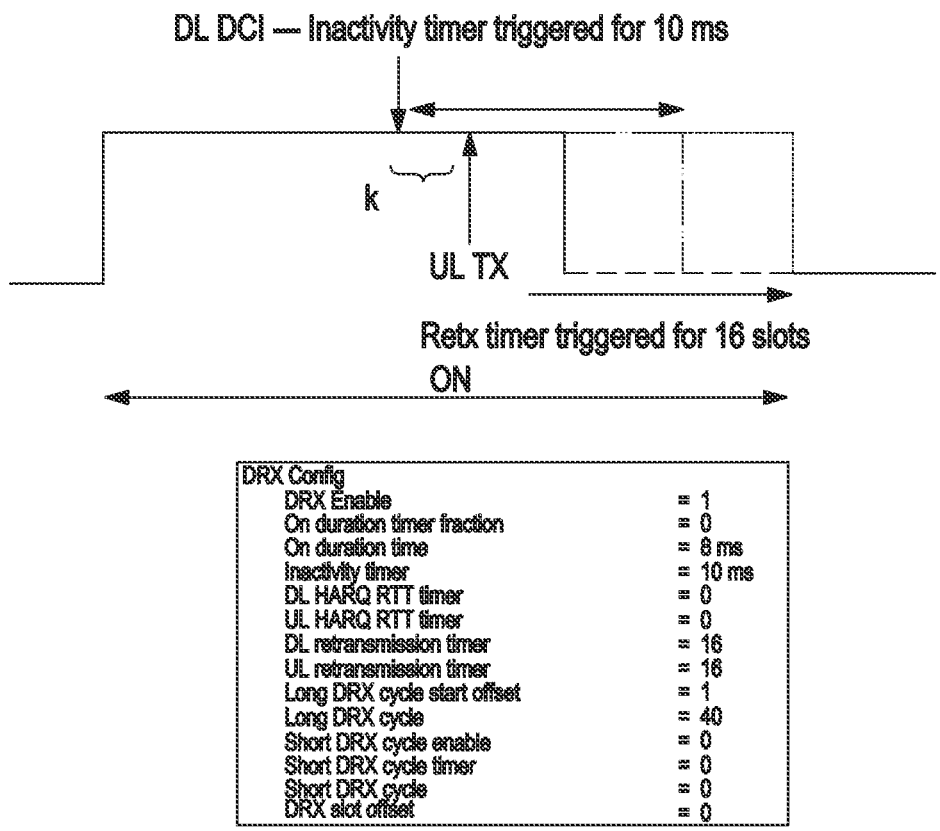
FIG. 10 is a signaling diagram for determining efficiency of a UE in managing a sleep duration in a CDRX communication session according to an embodiment of the disclosure.

FIG. 10 is a signaling diagram for determining efficiency of a UE in managing a sleep duration in a CDRX communication session according to an embodiment of the disclosure.

Referring to FIG. 10, the factors to be taken into account for determining the efficiency of the UE (201) in managing the sleep duration in the CDRX communication session:

K—difference between the triggers of inactivity timer and Re-tx timer.

Difference between re-tx timer and inactivity timer duration.

Harq RTT timer, if not 0.

The gain is calculated as follows:

$$\text{Gain} = k + \text{drx-HARQ-RTT-TimerUL} + (\text{drx-etransmissionTimerUL} - \text{drx-InactivityTimer}) \qquad \text{Equation 1}$$

If k=2 ms and Retx timer exceeds inact timer by 6 ms, overall gain time is 8 ms. UE sleeps 8 ms more in that CDRX cycle.

$$\text{Gain \%} = (\text{Gain}/\text{DRX cycle}) * 100 \qquad \text{Equation 2}$$

TABLE 3

| Inactivity Timer (milli-seconds) | Retx Timer (Slots) | DRX cycle length (milliseconds) | Gain (%) |
|---|---|---|---|
| 8 | 16 | 40/80/120 | 25/12.5/8 |
| 10 | 16 | 40/80/120 | 20/10/6 |
| 16 | 16 | 40/80/120 | 5/2.5/1.5 |

Table 1 provides gain % for various inactivity timer values. K=2, SCS=15 and HARQ RTT=0 has been assumed based on logs observations. If HARQ RTT timer is also non-zero, gain will increase.

Therefore, based on field logs a gain of 5-25% is achieved during the CDRX depending on configuration.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A method for managing sleep duration in a 5$^{th}$ Generation (5G) user equipment (UE), the method comprising:
    sending, by the UE, a plurality of data packets to a network in a connected mode discontinuous reception (cDRX) cycle;
    detecting, by the UE, an initiation of a retransmission timer associated with the plurality of data packets;
    determining, by the UE, if a retransmission of at least one data packet the plurality of data packets is required; and
    causing, by the UE, to sleep before an expiry of the retransmission timer, in response to determining that the retransmission of the at least one data packet of the plurality of data packets is not required.

2. The method of claim 1, wherein the determining, by the UE, if the retransmission of at least one data packet of the plurality of data packets is required comprises:
    detecting, by the UE, a transmission of the plurality of data packets is nearing completion; and
    determining, by the UE, if the retransmission of at least one data packet the plurality of data packets is required, in response to detecting that the transmission of the plurality of data packets is nearing completion.

3. The method of claim 2, wherein the at least one data packet of the plurality of data packets is determined as a last data packet sent by the UE during the retransmission timer based on buffer status of upper layers and on detecting that there are no data packets of the plurality of data packets pending for the transmission.

4. The method of claim 2, wherein the determining, by the UE, if the retransmission of the plurality of data packets is required comprises determining at least one of a connection quality of the network to be above a threshold and hybrid automatic repeat request (HARQ) retransmission process history and associated block error rate (BLER) indicating one of a no failure or negligible failure in the transmission of the plurality of data packets.

5. The method of claim 1, further comprises:
    obtaining, by the UE, a plurality of values associated with an uplink channel condition parameters after an initiation of a cDRX ON timer;
    determining, by the UE, a completion of an inactivity timer; and
    determining, by the UE, a start of the sleep duration of the UE based on the plurality of values associated with the uplink channel condition parameters, in response to determining the completion of the inactivity timer,
    wherein the uplink channel condition parameters comprises at least one of reference signal received power (RSRP), downlink (DL) path loss, reference signal received quality (RSRQ), UL block error rate signal-to-interference-plus-noise ratio (SINR), UL Transmission (TX) power, or a re-transmission (Re-Tx) count value for each of a hybrid automatic repeat request (HARQ) identification (HARQ-ID).

6. The method of claim 5, wherein the determining, by the UE, of the start of the sleep duration of the UE based on plurality of values associated with the uplink channel condition parameters comprises:
    detecting, by the UE, a status of a Re-Tx timer associated with one or more one uplink transmissions upon the completion of the inactivity timer, wherein the status comprises one of an ON or OFF;
    identifying, by the UE, at least one HARQ-ID and one or more slots associated with the at least one HARQ-ID when the status of the Re-Tx timer associated with the one or more uplink transmissions is ON; and
    determining, by the UE, the start of the sleep duration for the UE as the completion of the inactivity timer when the Re-Tx count value for the one or more uplink transmissions is less than a first pre-defined threshold; or
    determining, by the UE, the start of the sleep duration for the UE as the completion of the Re-Tx timer of an uplink transmission from the one or more uplink transmissions when the Re-Tx count value of the one or more uplink transmissions subsequent to the uplink transmission is less than the first pre-defined threshold.

7. The method of claim 5, wherein the determining, by the UE, of the start of the sleep duration of the UE based on the plurality of values associated with the uplink channel condition parameters comprises:
    comparing, by the UE, the plurality of values associated with an uplink channel condition parameters with a second pre-defined threshold after a pre-determined time from the completion of the inactivity timer;
    determining, by the UE, the start of the sleep duration for the UE as the pre-determined time when a result of comparison indicates that the plurality of values are greater than the second pre-defined threshold; and
    determining, by the UE, the start of the sleep duration for the UE as the completion of the Re-Tx timer when the result of comparison indicates that the plurality of values are lesser than the second pre-defined threshold.

8. The method of claim 5, wherein the determining, by the UE, of the start of the sleep duration of the UE based on the plurality of values associated with the uplink channel condition parameters comprises:
    providing, by the UE, at least one of a plurality of values associated with the uplink channel condition parameters, a HARQ-ID, and one or more slot numbers as an input to a pre-trained model; and
    determining, by the UE, the start of the sleep duration for the UE based on an output of the pre-trained model.

9. The method of claim 5, further comprising:
    determining, by the UE, that there are no UL data pending at upper layers and a packet data unit (PDU) to be transmitted is an end-marker MAC PDU; and
    notifying, by the UE, to the network the PDU to be transmitted is the end-marker MAC PDU by one of: setting a reserved bits in MAC PDU header, UL MAC CE, or UCI.

10. The method of claim 5, further comprises:
    detecting, by the 5G network, a notification that the PDU to be transmitted is an end marker MAC PDU;
    determining, by the 5G network, whether the end-marker MAC PDU is received at the 5G network successfully; and
    performing, by the 5G network, one of:
        send a MAC CE DRX Command for early Sleep in DL, in response to determining that the end-marker MAC PDU RX is successful, or
        send one of a new DL DCI or a new UL grant for Re-Tx, in response to determining that the end-marker MAC PDU RX is not successful.

11. A user equipment (UE) for managing a sleep duration when connected to a 5$^{th}$ Generation (5G) network, the UE comprises:
    a memory;
    a processor communicatively coupled to the memory; and
    a sleep duration controller communicatively coupled to the memory and the processor, wherein the sleep duration controller is configured to:
send a plurality of data packets to a network in a connected mode discontinuous reception (cDRX) cycle,
detect an initiation of a retransmission timer associated with the plurality of data packets,
determine if a retransmission of at least one data packet of the plurality of data packets is required, and
cause to sleep before an expiry of the retransmission timer, in response to determining that the retransmission of the at least one data packet of the plurality of data packets is not required.

12. The UE of claim 11,
wherein the sleep duration controller is further configured to:
detect a transmission of the plurality of data packets is nearing completion, and
determine if the retransmission of at least one data packet the plurality of data packets is required, in response to detecting that the transmission of the plurality of data packets is nearing completion,
wherein the at least one data packet of the plurality of data packets is determined as a last data packet sent by the UE during the retransmission timer based on buffer status of upper layers and on detecting that there are no data packets of the plurality of data packets pending for the transmission, and
wherein determining, by the UE, if the retransmission of the plurality of data packets is required comprises determining at least one of a connection quality of the network to be above a threshold or hybrid automatic repeat request (HARQ) retransmission process history and associated block error rate (BLER) indicating one of a no failure or negligible failure in the transmission of the plurality of data packets.

13. The UE of claim 12,
wherein the sleep duration controller is further configured to:
obtain a plurality of values associated with an uplink channel condition parameters after an initiation of a cDRX ON timer,
determine a completion of an inactivity timer, and
determine a start of the sleep duration of the UE based on the plurality of values associated with the uplink channel condition parameters, in response to determining the completion of the inactivity timer,
wherein the uplink channel condition parameters comprises at least one of reference signal received power (RSRP), downlink (DL) path loss, reference signal received quality (RSRQ), UL block error rate (BLER), signal-to-interference-plus-noise ratio (SINR), UL Transmission (TX) power, and a re-transmission (Re-Tx) count value for each of a hybrid automatic repeat request (HARQ) identification (HARQ-ID).

14. The UE of claim 13, wherein the sleep duration controller is further configured to:
determine the start of the sleep duration for the UE based on the uplink channel condition parameters, in response to determining the completion of the inactivity timer including the including the Re-Tx count value comprises:
detect a status of a Re-Tx timer associated with one or more one uplink transmissions upon the completion of the inactivity timer, wherein the status comprises one of a ON and OFF; and
identify at least one HARQ-ID and one or more slots associated with the at least one HARQ-ID when the status of the Re-Tx timer associated with the one or more uplink transmissions is ON;
determine the start of the sleep duration for the UE the completion of the inactivity timer when the Re-Tx count value for the one or more uplink transmissions is lesser than a first pre-defined threshold; or
determine the start of the sleep duration for the UE as the completion of the Re-Tx timer of an uplink transmission from the one or more uplink transmissions when the Re-Tx count value of the one or more uplink transmissions subsequent to the uplink transmission is lesser than the first pre-defined threshold.

15. The UE of claim 13, wherein the sleep duration controller is further configured to:
determine the start of the sleep duration for the UE based on the uplink channel condition parameters, in response to determining the completion of the inactivity timer, comprises:
compare the plurality of values associated with an uplink channel condition parameters with a second pre-defined threshold after a pre-determined time from the completion of the inactivity timer,
determine the start of the sleep duration for the UE as the pre-determined time when a result of comparison indicates that the plurality of values are greater than the second pre-defined threshold; and
determine the start of the sleep duration for the UE as the completion of the Re-Tx timer when the result of comparison indicates that the plurality of values are lesser than the second pre-defined threshold.

16. The UE of claim 13, wherein the sleep duration controller is further configured to:
provide, by the UE, at least one of a plurality of values associated with the uplink channel condition parameters, a HARQ-ID, and one or more slot numbers as an input to a pre-trained model, and
determine, by the UE, the start of the sleep duration for the UE based on an output of the pre-trained model.

17. The UE of claim 13, wherein the sleep duration controller is further configured to:
determine, by the UE, that there are no UL data pending at upper layers and a PDU to be transmitted is an end-marker MAC PDU, and
notify, by the UE, to the network the PDU to be transmitted is the end-marker MAC PDU by one of: setting a reserved bits in MAC PDU header, UL MAC CE, or UCI.

* * * * *